(12) United States Patent
Gupta et al.

(10) Patent No.: US 10,516,694 B1
(45) Date of Patent: Dec. 24, 2019

(54) HIERARCHICAL MITIGATION OF DENIAL OF SERVICE ATTACKS ON COMMUNICATION NETWORKS

(71) Applicant: Amazon Technologies, Inc., Seattle, WA (US)

(72) Inventors: Piyush Gupta, Issaquah, WA (US); Stephen Andrew Stroud Saville, Seattle, WA (US); Andrew John Kiggins, Seattle, WA (US); Atulya S. Beheray, Sammamish, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 691 days.

(21) Appl. No.: 15/084,354

(22) Filed: Mar. 29, 2016

(51) Int. Cl.
*H04L 29/06* (2006.01)

(52) U.S. Cl.
CPC ...... *H04L 63/1458* (2013.01); *H04L 63/1416* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 7,730,536 B2* | 6/2010 | Pasko | ............... | H04L 63/1458 726/12 |
| 2007/0118896 A1* | 5/2007 | Soejima | ............... | H04L 63/14 726/22 |
| 2017/0104774 A1* | 4/2017 | Vasseur | ............... | G06N 20/00 |

* cited by examiner

*Primary Examiner* — Allen C Chein
*Assistant Examiner* — Denisse Y Ortiz Roman
(74) *Attorney, Agent, or Firm* — Knobbe, Martens, Olson & Bear, LLP (57) ABSTRACT

Systems and methods are described to enable mitigation of network attacks in communication networks. When a network attack is detected, packets within the communication network are routed through a hierarchical mitigation system, which includes at least two tiers of mitigation devices configured to apply mitigation techniques to the packets. Outer tiers of the hierarchical mitigation system (e.g., closer to an edge of the communication network) can apply simple mitigation techniques that are efficient even when distributed, and which provide early mitigation for attack packets while not requiring large amounts of computing resources. Inner tiers of the hierarchical mitigation system (e.g., closer to a destination device) can apply more complex mitigation systems that may require centralized application, and which provide more robust mitigation at a potentially higher computing resource cost.

19 Claims, 5 Drawing Sheets

HIERARCHICAL MITIGATION OF DENIAL OF SERVICE ATTACKS ON COMMUNICATION NETWORKS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Service providers or content creators (such as businesses, artists, media distribution services, etc.) can employ a series of interconnected data centers to deliver content (such as web sites, web content, or other digital data) to users or clients. These interconnected data centers are sometimes referred to as "content delivery networks" (CDNs) or content delivery systems. Existing routing and addressing technologies can enable multiple data centers associated with a content delivery system to provide similar or identical content to client computing devices. In some instances, each data center providing a set of content may be referred to as a point-of-presence ("POP"). A content delivery system can maintain POPs over a wide area (or worldwide) to enable the system to efficiently service requests from clients in a variety of locations.

Malicious entities occasionally attempt to disrupt the operations of service providers or content creators via network-based attacks ("network attacks"). One mechanism for doing so is a "denial of service" (DoS) attack. These attacks generally attempt to make a target computing device or network resource, such as a web site, unavailable to legitimate clients. One common instance of a DoS attack involves saturating the target device or network with external communications requests, such that it cannot respond to legitimate traffic, or it responds so slowly as to be rendered effectively unavailable. Because of the number of requests required to mount such an attack, responsibility for implementing the attack is often distributed across many computing devices. These distributed attacks are therefore known as "distributed denial of service" (DDoS) attacks. Because attacked targets, such as specific web sites or domain names, are often hosted or associated with a content delivery system, that system itself may also be targeted by the attack. Further, the content delivery system often hosts content on behalf of non-targeted systems or networks, which may also be affected by the attack due to their use of the content delivery system. In addition to limiting access to attacked targets (or other content hosted in associated systems), DoS attacks result in ecological and financial harm to content delivery systems. The large increase in traffic often causes an increase in computing resources used by the content delivery system, increasing power usage, heat output, and wear on effected systems.

Because network attacks frequently attempt to oversaturate a target network, the content and form of the attack can vary. In some instances, data transmitted as part of an attack can be formed to resemble legitimate traffic. Thus, it can be difficult for both automated and manual systems to distinguish network attacks from legitimate traffic. Often, mitigation of a network attack involves discarding data assumed to form part of an attack. Thus, falsely identifying a network attack can result in legitimate traffic being discarded, which is of course undesirable. On the other hand, failing to quickly identify a network attack can result in resources becoming overloaded and unable to service legitimate requests (along with the other negative effects discussed above), which is also undesirable.

DETAILED DESCRIPTION

Generally described, the present disclosure relates to mitigating network attacks, such as denial of service ("DoS") attacks, on communications networks. More specifically, aspects of the present disclosure relate to utilizing a hierarchically-structured series of mitigation devices to perform successively more aggressive mitigation techniques, thereby enabling less aggressive mitigation techniques to halt a large proportion of attack traffic early within a communications path, while still enabling more aggressive mitigation techniques to occur later within the communications path. As noted above, transmission of attack traffic has many downsides for a network, including increases in required computing resources, electricity consumption, congestion, and economic costs. It is therefore desirable to stop attack traffic (e.g., by "dropping" or discarding data packets forming part of the attack traffic) as early as possible within a communications path (e.g., at the first communication node where the attack traffic is observed). However, the first communication nodes that observe attack traffic are often those least equipped to employ effective attack mitigations. These nodes are often considered "edge" nodes, and are situated at desirable locations that ensure interconnectivity with other networks. Because many different network providers may utilize these locations, an edge node may have access to only a limited amount of computing resources with which to mitigate attacks. As attack mitigations often consume large amounts of computing resources, many mitigation techniques are simply not feasible to implement at edge nodes. Moreover, because network attacks are often distributed, and because many communications paths exist to reach a targeted device (e.g., a content server being attacked), an individual edge node is unlikely to experience more than a minor portion of the total attack traffic directed to a targeted device. However, many mitigation techniques (such as connection throttling) attempt to operate as a function of all traffic directed to a targeted device, and thus function ineffectively or improperly at edge nodes. While implementing mitigation techniques later within a communications path (e.g., within a closer network distance) to a targeted device can address these limitations, such placement results in attack traffic being routed over a substantial portion of the communications network, and thus is associated with the drawbacks discussed above (e.g., increased energy use, computing resource use, cost, etc.). To address these and other issues, the current disclosure pertains to a hierarchical mitigation structure for communications networks, such as content distribution systems, that utilizes a tiered set of attack mitigators, which process network traffic according to progressively more aggressive mitigation techniques (or mitigation techniques otherwise suited for the location of the attack mitigator relative to the targeted device and the attack source). The system disclosed herein enables relatively low-cost (e.g., in terms of computing resources) mitigation techniques to be performed early within a communications path, thereby removing substantial portions of the attack traffic from the network, while also performing relatively high-cost but potentially more effective mitigation techniques later within the communications path. The system disclosed herein thus achieves both an increase in efficiency of a communications network relative to a mitigation technique performed purely nearby to a targeted device, as well as an increase in effectiveness relative to a mitigation technique performed purely at an edge node.

In some instances, different mitigation devices may be associated with different hierarchical levels in a communication network. For example, a first mitigation device may be deployed nearby to a potential target, such as within the same server rack or data center as the potential target. A second mitigation device may be deployed at an "edge" of the network (e.g., a portion of a communications network that connects the network to other networks). In some instances, one or more additional mitigation devices may be deployed between the potential target and an edge node, as intermediary mitigation devices. Each mitigation device may be programmed to perform one or more mitigation techniques with respect to traffic addressed to a potential target. Various examples of mitigation techniques are known in the art, and include (but are not limited to) packet filtering (e.g., based on a signature of attack packets, matching packets to regular expressions, etc.), SYN proxying, connection limiting, rate throttling, aggressive aging, suspicion scoring, white listing, and black listing. When a network attack occurs, routing devices within the communications network may redirect all or a portion of traffic to a nearby traffic mitigation device, which may filter or shape the traffic according to a mitigation technique, and forward any "legitimate" traffic (e.g., traffic that has been shaped or filtered by the mitigation technique, which may or may not actually be legitimate) toward the destination device. In some instances, a mitigation device may return traffic to a normal path on the communication network, by forwarding filtered or shaped traffic to standard network nodes. In other instances, a mitigation device may forward traffic to other mitigation devices that are more nearby to the destination device. In one embodiment, the mitigation techniques performed by a given mitigation device may be based at least in part on a proportion of traffic for a potential target that is expected to be observed at a mitigation device. For example, a mitigation device situated very near to a target may be expected to be capable of observing all or a large portion of traffic addressed to a potential target (e.g., because traffic destined for the target must or is highly likely to pass through a network device configured to forward potential attack traffic to the mitigation device). Accordingly, the mitigation device may implement one or more mitigation techniques with an effectiveness linked to a proportion of traffic to which the technique is applied. For example, techniques such as connection tracking (e.g., taking action on packets based on whether they form part of a previously established connection, such as by dropping packets that are not part of a known connection) or rate throttling (e.g., intentionally limiting a rate of communications for a given device, such as a device suspected of forming part of a network attack) are generally more effective when applied to all traffic directed to a host than when applied to a small proportion of traffic, and thus may be implemented by a mitigation device that is expected to observe all or most traffic directed to a potential target. In general, many stateful mitigation techniques (e.g., techniques that rely on knowledge of state, such as rate throttling or connection tracking) are more effective when applied to all traffic directed to a potential target. As a converse example, a mitigation device that is expected to observe a small proportion of traffic directed to a potential target (e.g., because multiple other paths exist through a communication network to the target) may implement a mitigation technique that is not dependent (or not heavily dependent) on a proportion of traffic observed at the mitigation device. Illustratively, packet filtering based on per-packet rules (e.g., rules that do not differ per-packet) can generally be applied to any proportion of traffic, without negative effect. Accordingly, if all communications paths to a target are associated with mitigation devices, each of which performs packet filtering on only a small portion of the overall traffic addressed to the target, the result is likely to be largely the same as if a single device performed traffic filtering on all traffic addressed to the target. In fact, distribution of packet filtering may be preferable, as it can often discard malicious packets earlier within a communications path, resulting in increased efficiency of the communications network. Generally, many stateless mitigation techniques (e.g., techniques that do not rely on knowledge of a state of the mitigation technique with respect to other packets, such as a simple packet filter that drops or accepts packets based on characteristics of the packets themselves, without reference to other packets) have an effectiveness not linked to the proportion of a target's traffic to which the technique is applied. In one embodiment, the proportion of traffic to a potential target that is expected to be observed at a given mitigation device can be predicted as a function of network distance (e.g., number of hops, latency, etc.) between the potential target and the mitigation device. Accordingly, a network device within a first threshold distance (e.g., five hops) of a target may be expected to see a large proportion of traffic to the target, while a network device outside of the first threshold distance but within a second threshold distance (e.g., 30 hops) may be expected to see a smaller proportion of traffic, etc. In some instances, one or more mitigation devices may be deployed "in-line" with a potential target, such that all traffic to the target is guaranteed to be observable at the in-line devices. This in-line technique may enable complex mitigations to be effectively carried out, to shield the target from all or a large majority of the negative effects of a network attack.

Alternatively or in addition to varying mitigation techniques according to expected proportions of observable traffic, mitigation techniques may be varied within a hierarchy of mitigation devices based on the computing resources available to each mitigation device. Under many configurations of communications networks, mitigation devices implemented nearby to a potential target (e.g., a content server) can be expected to have access to a high amount of computing resources (e.g., because the devices are implemented in data centers optimized for providing access to those computing resources). Accordingly, these mitigation devices may be configured to implement relatively complex mitigation techniques that require high amounts of computing resources (e.g., including stateful mitigation techniques). Similarly, under many communication network configurations, mitigation devices implemented on edge nodes can be expected to have access to more limited computing resources (e.g., because the devices are implemented at "carrier hotels" or other co-owned facilities that are optimized for interconnection, rather than access to large amounts of computing resources). Accordingly, these mitigation devices may be configured to implement relatively simple mitigation techniques that require low amounts of computing resources (e.g., including stateless mitigation techniques or simply packet filtering).

In one embodiment, network devices within a communications network may themselves function as mitigation devices. Accordingly, when a network attack is detected on a communications network (e.g., when it is determined that a network attack is likely occurring, regardless of whether all aspects of the attack are known), the network devices themselves may implement a mitigation technique (e.g., dependent on their access to computing resources, the expected proportion of traffic to be observed, etc.). For example, network devices may themselves begin to implement stateful mitigation techniques, such as throttling a rate of traffic from a given source, or begin to implement stateless mitigation techniques, such as accepting or dropping packets based on parameters of those packets. In another embodiment, network devices within a communications network may be associated with one or more mitigation devices, to which traffic addressed to a potential target is forwarded during a network attack. Accordingly, when a network attack occurs, a network device may be configured to forward all or a portion of traffic (e.g., traffic addressed to a network address identified as a potential target, traffic addressed to network addresses deemed by a network administrator as "protected," etc.) to an associated mitigation device, which may perform a mitigation technique and route the filtered or shaped red traffic (post mitigation) further within the communications network. Systems and methods for detecting a network attack on a communication method are described, for example, within U.S. patent application Ser. No. 15/083,183, entitled "DETECTING DENIAL OF SERVICE ATTACKS ON COMMUNICATION NETWORKS," and filed on Mar. 28, 2016 (the '183 Application), the entirety of which is hereby incorporated by reference.

While examples are provided herein with respect to specific types of communication networks, such as content distribution systems, embodiments of the present application may be implemented with respect to any network of computing devices that operates to serve content to client computing devices. Moreover, while some examples are provided with respect to a communications network as a whole, embodiments of the present application may also be implemented in whole or in part by discrete portions of communications networks. For example, a series of network devices within a communication network may implement a hierarchical set of mitigations with respect to a network attack, regardless of whether each network device implements such mitigations. Still further, while some examples are provided herein with respect to certain types of devices targeted by network attacks, such as content servers, embodiments of the present application may function with respect to any potential target of a network attack, such as devices that provide network-based services. Thus, the examples provided herein are intended to be illustrative, and not exhaustive, in nature.

As will be appreciated by one of skill in the art in light of the description above, the embodiments disclosed herein substantially increase the ability of computing systems, such as content delivery systems, to mitigate network attacks that would otherwise impair the function and reduce the efficiency of a communication network and the computing systems themselves. Thus, the presently disclosed embodiments represent an improvement in the functioning of such computing systems, by enabling content delivery systems or other networked devices to continue to service legitimate client requests even while receiving large numbers of illegitimate requests. Moreover, the presently disclosed embodiments address technical problems inherent within computing systems; specifically, the limited ability of computing systems to process network-based requests and the difficulty in distinguishing legitimate network transmissions from those associated with malicious attacks. These technical problems are addressed by the various technical solutions described herein, including the utilization of a hierarchical set of mitigation techniques that vary in complexity according to the proportion of traffic of a target expected to be observed at a mitigation device and/or the computing resources available to the mitigation device. Thus, the present application represents a substantial improvement on existing network systems and computing systems in general.

The foregoing aspects and many of the attendant advantages of the present disclosure will become more readily appreciated as the same become better understood by reference to the following, when taken in conjunction with the accompanying drawings.

Figure 1:
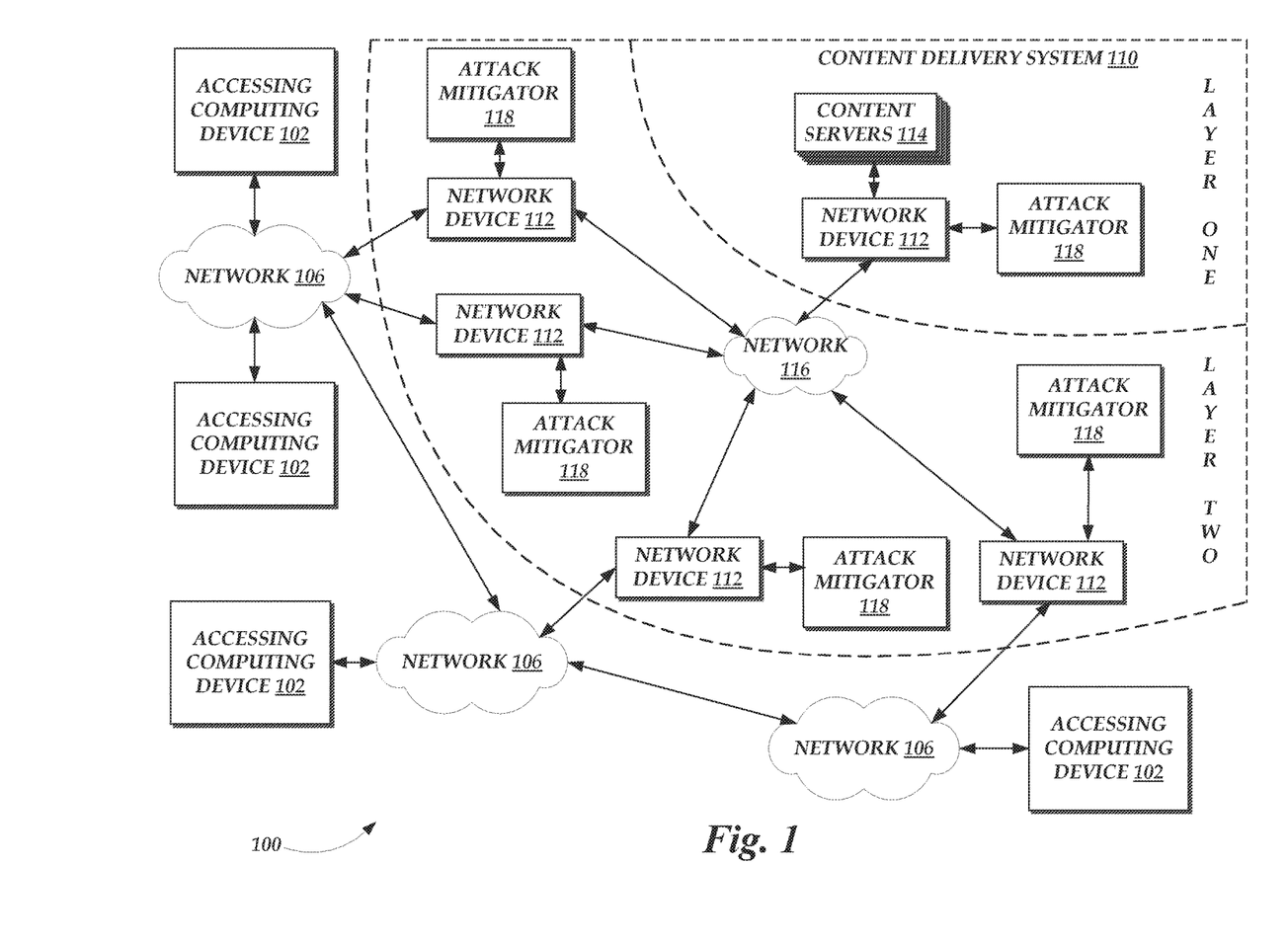
FIG. 1 is a block diagram depicting an illustrative logical network environment including multiple accessing computing devices and content servers interconnected by a content delivery system implementing a hierarchical network of attack mitigators.

FIG. 1 is a block diagram depicting an illustrative logical network environment 100 including multiple accessing computing devices 102 and multiple content servers 114 in communication with a content delivery system 110 via networks 106. The networks 106 may be any wired network, wireless network, or combination thereof. In addition, the networks 106 may be personal area networks, local area networks, wide area networks, cable networks, satellite networks, cellular telephone networks, or combinations thereof. In the example environment of FIG. 1, networks 106 form portions of a global area network (GAN), such as the Internet. Protocols and components for communicating via the other aforementioned types of communication networks are well known to those skilled in the art of computer communications and thus, need not be described in more detail herein. While the various devices of FIG. 1 are shown as having specific interconnections, each device may connect to the networks 106 or to one another at multiple points, including points different from those shown in FIG. 1. Accordingly, communication times and capabilities may vary between the components of FIG. 1.

Accessing computing devices 102 may include any number of different computing devices capable of communicating with the content delivery system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Further, accessing computing devices 102 may include devices utilized by both legitimate clients of the content delivery system 110 and devices utilized by malicious parties to undertake network-based attacks, such as DoS attacks, on the content delivery system 110.

The content delivery system 110 can include a variety of components and devices configured to enable accessing computing devices 102 to access content that is made available by the content delivery system 110. Specifically, the content delivery system 110 can include a number of content servers 114 configured to host content (e.g., web pages, multimedia content, etc.). Each content server 114 may include a computing device, or a collection of computing devices, configured to serve content to accessing computing devices 102. Accordingly, though not shown in FIG. 1, each content server 114 may include any number of processors, data stores, or networking components operating in conjunction to facilitate retrieval of content.

Each content server 114 may communicate with the networks 106 (and accordingly with the accessing computing devices 102) by a series of network devices 112 under control of the content delivery system 110. In the context of FIG. 1, these network devices are logically divided into two hierarchical layers. Specifically, a first network device 112 is included within "Layer One," and exists at a relatively low network distance to the content servers 114 (e.g., within the same data center, within the same server rack, or hosted on a common host computing device). The network device 112 of Layer One is interconnected with additional network devices 112 (grouped in FIG. 1 as associated with "Layer Two") via a network 116. As will be appreciated by one of skill in the art, network 116 may include any number of additional network devices 116 that are not shown in FIG. 1 for simplicity. As in the case of the network 106, the network 116 may be any wired network, wireless network, or combination thereof. In addition, the network 116 may be a personal area network, local area network, wide area network, cable network, satellite network, cellular telephone network, or combination thereof. In the context of FIG. 1, network devices 112 within Layer Two illustratively represent "edge" devices, which enable the content delivery system to interact with the networks 106 (e.g., as controlled by distinct entities or otherwise logically divided from the content delivery system). The network devices 112 of FIG. 1 may include any of a variety of well-known devices, such as routers, switches, bridges, hubs, etc. As will be appreciated by one of skill in the art, the network devices 112 and the content servers 114 have limited and varying access to computing resources, and thus, a corresponding limited capacity to process transmissions from accessing computing devices 102. Accordingly, the network devices 112 and content servers 114 may be susceptible to network attacks, such as DoS attacks, that attempt to overwhelm the network devices 112 and content servers 114 with malicious, illegitimate data.

In accordance with embodiments of the present disclosure, the content delivery system 110 can therefore include a number of attack mitigators 118, which collectively implement hierarchical attack mitigation techniques with respect to traffic addressed to the content servers 114 (e.g., representing targets of network attacks). Specifically, attack mitigators 118 associated with edge nodes (e.g., network devices 112 of Layer Two) can implement relatively simple attack mitigation techniques, such as stateless mitigation techniques or techniques associated with low usage of computing resources, while attack mitigators 118 associated with Layer One can implement relatively complex attack mitigation techniques, such as stateful mitigation techniques or techniques associated with high usage of computing resources. In this manner, at least some (and potentially a large amount) of malicious traffic can be discarded at the edge of the content delivery system 110, reducing the negative effects associated with transmission of traffic on such a system, while not sacrificing the protection provided by complex mitigation techniques, as implemented by the Layer One attack mitigator 118. Indeed, the use of hierarchical mitigation, as disclosed herein, may enable more complex or resource-intensive techniques to be utilized by layer one attack mitigators 118, as the load that would otherwise exist on such mitigators 118 may be substantially reduced by layer two mitigators 118.

While two layers of attack mitigators 118 are shown in FIG. 1 for ease of description, the content delivery system 110 may in some instances be logically divided into more than two layers. For example, where the content servers 114 represent virtual computing devices, "Layer One" of the content delivery system 110 may include attack mitigators 118 also implemented on virtual computing devices and sharing a virtual computer network. In such an embodiment, "Layer Two" attack mitigators 118 may be implemented at a point where traffic enters that virtual computing network (e.g., from a publically addressable network), and "layer three" attack mitigators 118 may be implemented on edge nodes of the content delivery system 110 (e.g., taking the place of the Layer Two devices shown in FIG. 1). The content delivery system 110 can thus be divided into any number of logical subdivisions, with each logical layer including one or more attack mitigators 118 configured to implement progressively more aggressive or complex mitigation techniques based on their proximity to a potential target. In some embodiments, different network devices 112 or attack mitigators 118 may divide the content delivery network 110 differently (e.g., according to a different number of layers, or placing different devices into those layers).

While each network device 112 is shown in FIG. 1 as associated with a single attack mitigator 118, some embodiments of the present disclosure may include multiple attack mitigators 118 that are associated with a single network device 112. Similarly, some embodiments of the present disclosure may include multiple network devices 118 associated with a single attack mitigator 118. In some instances, a network device 112 itself may function as an attack mitigator 118, or both a network device 112 and an attack mitigator 118 may be implemented on a common underlying computing device.

It will be appreciated by those skilled in the art that the content delivery system 110 may have fewer or greater components than are illustrated in FIG. 1. For example, the content delivery system 110 may include one or more components configured to detect the occurrence of a network attack within the content delivery system, such as the attack detection system described within the '183 Application (e.g., at FIG. 1 of that application). In addition, the content delivery system 110 could include various web services and/or peer-to-peer network configurations. Thus, the depiction of the content delivery system 110 in FIG. 1 should be taken as illustrative. For example, in some embodiments, components of the content delivery system 110, such as the attack mitigators 118 or the content servers 114, may be executed by one more virtual machines implemented in a hosted computing environment. A hosted computing environment may include one or more rapidly provisioned and released computing resources, which computing resources may include computing, networking and/or storage devices. A hosted computing environment may also be referred to as a cloud computing environment.

Any one or more of the attack mitigators 118, content servers 114, and network devices 112 may be embodied in a plurality of components, each executing an instance of the respective attack mitigators 118, content servers 114, and network devices 112. A server or other computing component implementing any one of the attack mitigators 118, content servers 114, and network devices 112 may include a network interface, memory, processing unit, and computer readable medium drive, all of which may communicate which each other by way of a communication bus. The network interface may provide connectivity over the network 106, network 116, and/or other networks or computer systems. The processing unit may communicate to and from memory containing program instructions that the processing unit executes in order to operate the respective attack mitigators 118, content servers 114, and network devices 112. The memory may generally include RAM, ROM, other persistent and auxiliary memory, and/or any non-transitory computer-readable media, such as a hard drive (HDD), a solid state drive (SDD), network attached storage (NAS), a tape drive, or any combination thereof.

Figure 2:
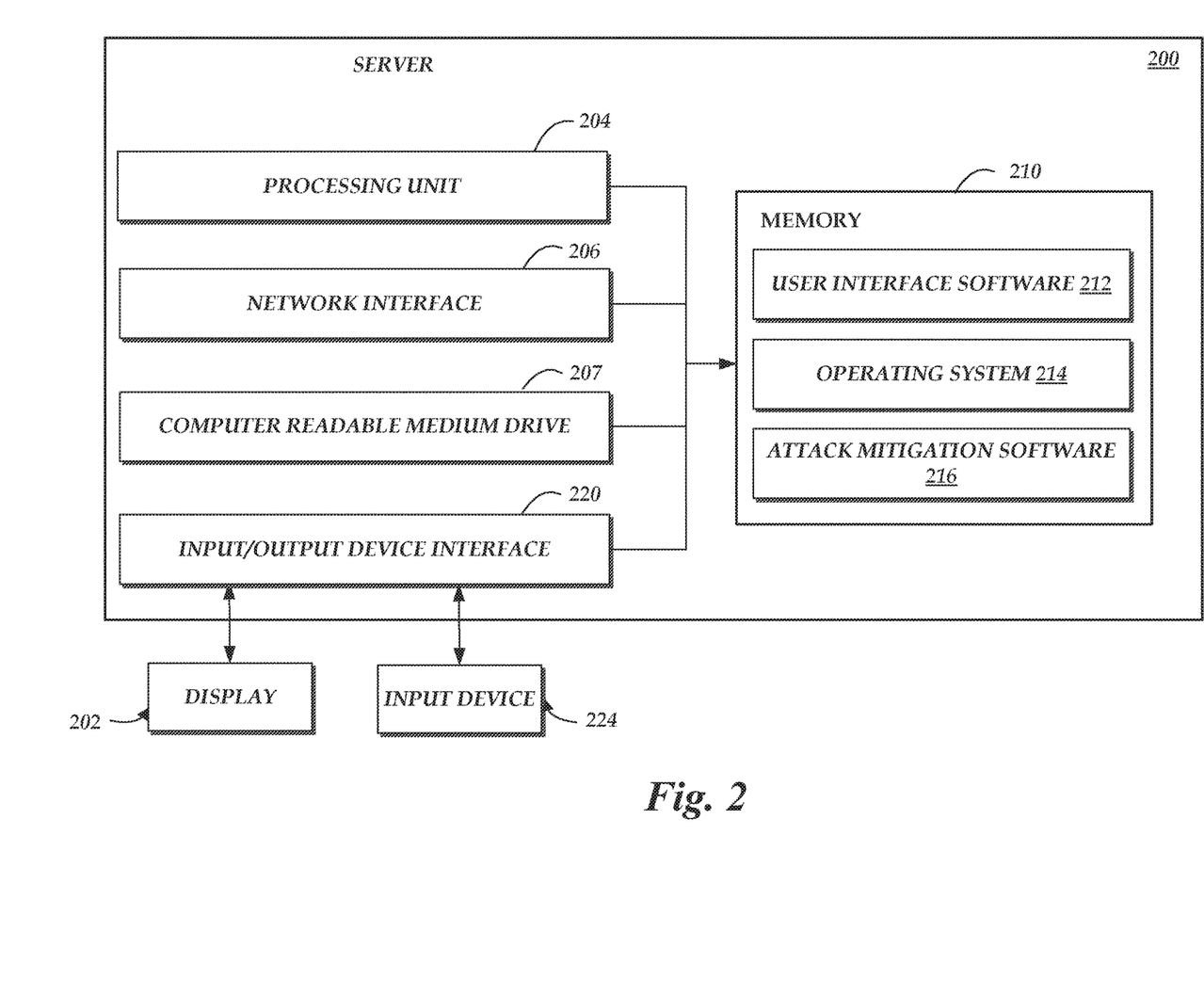
FIG. 2 is a block diagram depicting an illustrative configuration of one embodiment of an attack mitigator of FIG. 1.

FIG. 2 depicts one embodiment of an architecture of a server 200 that may implement an attack mitigator 118 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 202, and an input device 224, all of which may communicate with one another by way of a communication bus. The network interface 206 may provide connectivity to one or more networks or computing systems, such as the network devices 112 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channel (e.g., via the network interface 206).

The memory 210 may include computer program instructions that the processing unit 204 executes in order to implement one or more embodiments. The memory 210 generally includes RAM, ROM and/or other persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as data store 120.

In addition to the user interface module 212, the memory 210 may include attack mitigation software 216 that may be executed by the processing unit 204 to implement mitigation techniques utilized in accordance with the present disclosure. As described above, such mitigation techniques may include (but are not limited to) packet filtering (e.g., dropping, accepting, or otherwise modifying routing of a packet based on a signature of attack packets, such as parameters of the packets matching one or more values or ranges or matching regular expressions, etc.), SYN proxying (e.g., use of an intermediary to process SYN packets indicating a half-open connection, while forwarding only completed connections to a target), connection limiting (e.g., limiting the number of connections a given source may have on a communications node or to a specific target), rate throttling (e.g., slowing down a speed at which packets from a given source are transmitted, or limiting a total rate of packet transmission from the client), aggressive aging (e.g., modifying a timeout value for dropping connections from a connections table based on current load), suspicion scoring (e.g., attributing a score to a packet based on its likelihood of forming part of an attack, and processing the packet different based on the score), white listing (e.g., designating certain packets as "known safe" based on parameters of packets, such as source network addresses), and black listing (e.g., designating certain packets as "known malicious" based on parameters of packets, such as source network addresses). Techniques for implementing these attack mitigation techniques are generally known within the art, and thus will not be described in detail herein. In some instances, the attack mitigation software 216 within an individual attack mitigator 118 may enable the mitigator 118 to implement one or more mitigation techniques specific to the location of that mitigator 118 within the content delivery system 110 (e.g., stateless mitigation for edge locations, stateful mitigation for locations nearby to a potential target). In other embodiments, the attack mitigation software 216 within an individual attack mitigator 118 may enable the mitigator 118 to implement various types of attack mitigations, and to select the specific attack mitigations to implement based on various criteria (e.g., distance from a potential target, availability of computing resources, etc.) While the attack mitigation software is shown in FIG. 2 as part of the server 200, in other embodiments, all or a portion of the software may be implemented by alternative computing devices within the content delivery system 110, such as virtual computing devices within a hosted computing environment.

Figure 3A:
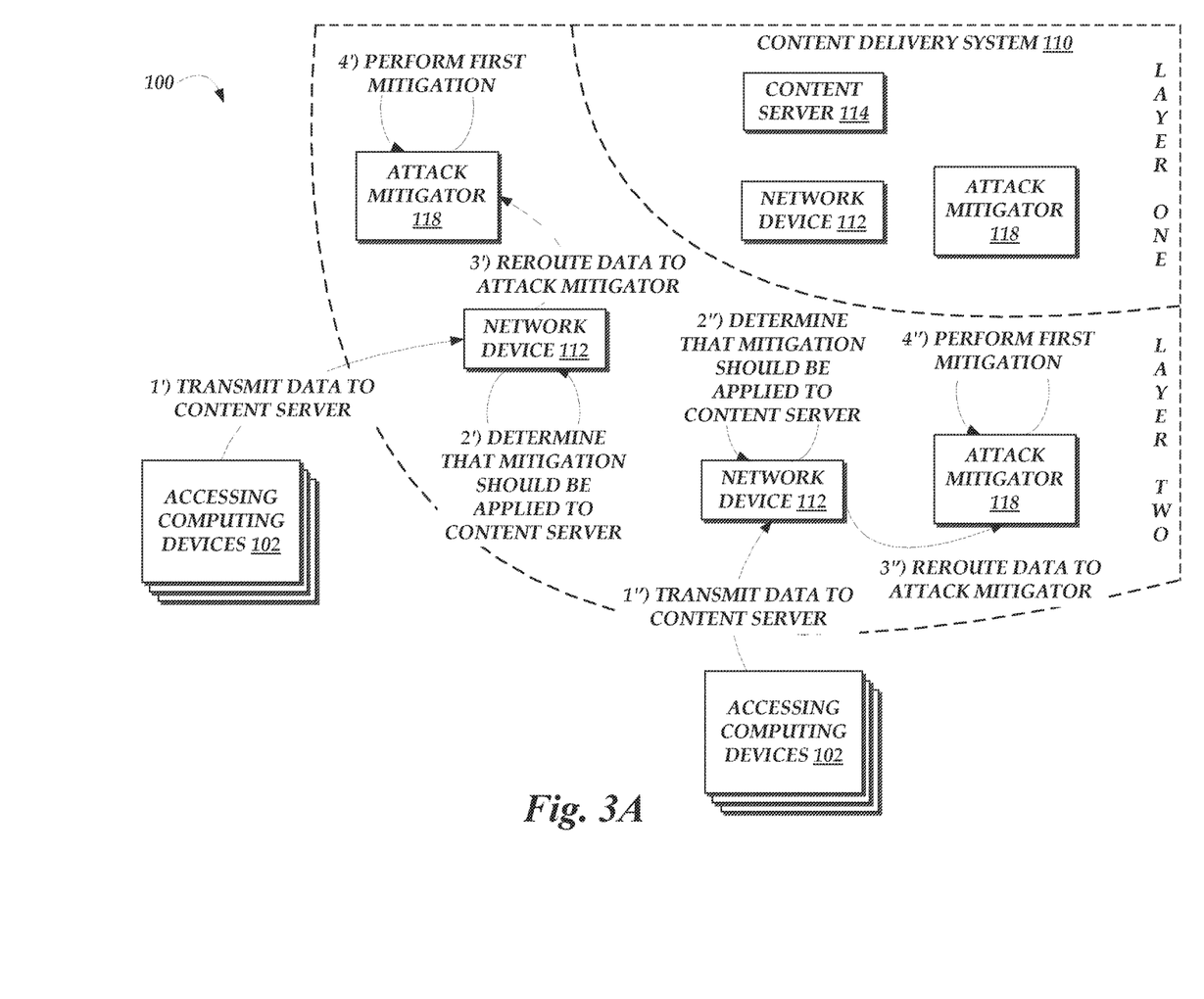
FIGS. 3A and 3B are block diagrams depicting illustrative interactions for implementing hierarchical mitigation of a network attack on the content delivery system of FIG. 1 by passing traffic to an attacked destination through a series of attack mitigators.
Figure 3B:
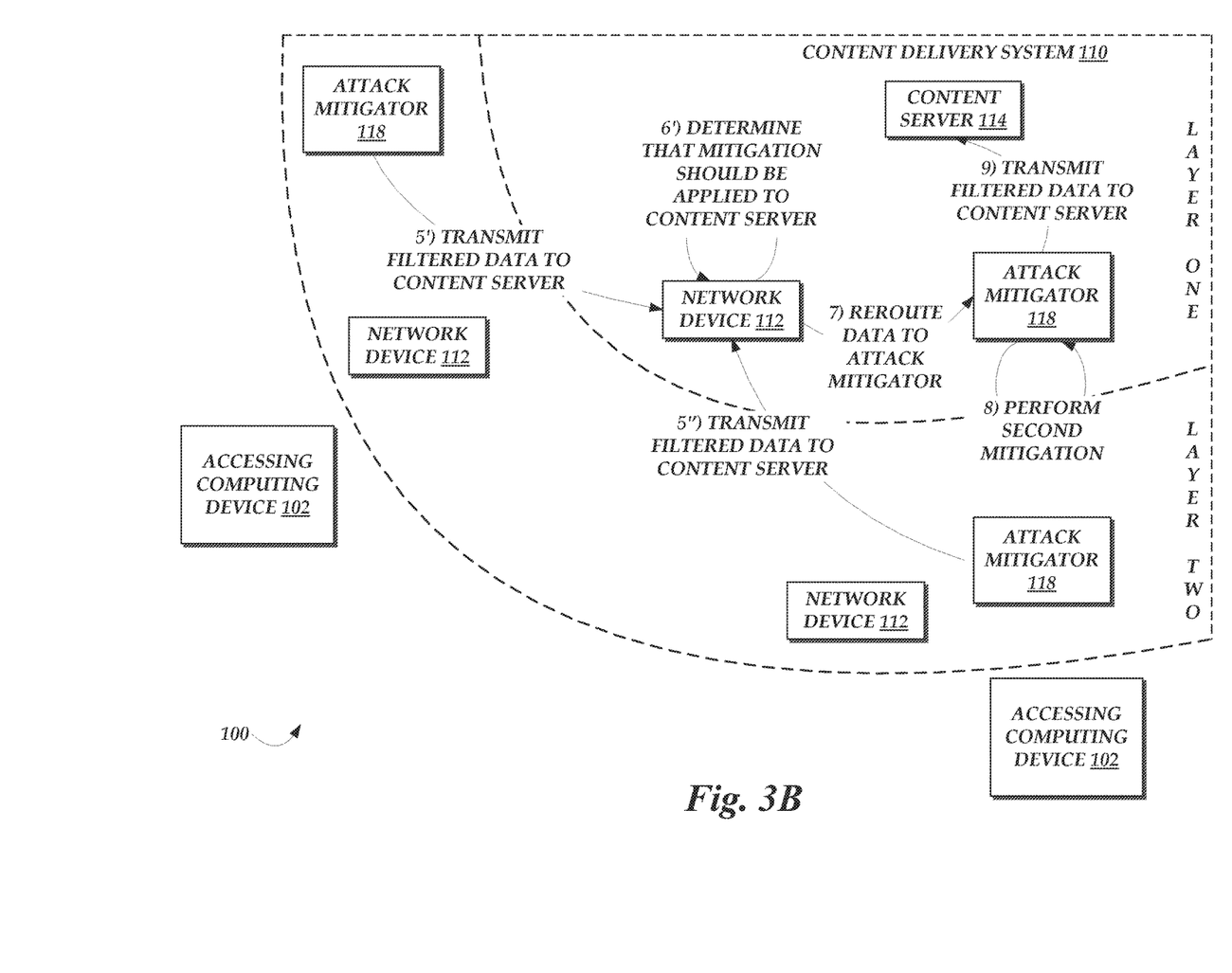

FIGS. 3A and 3B depict a set of illustrative interactions for implementing hierarchical attack mitigations with respect to traffic on a content delivery system 110. Specifically, the interactions of FIGS. 3A and 3B depict a two-tier hierarchical mitigation, in which a first-level mitigation (e.g., a stateless mitigation) is implemented by attack mitigators 118 associated with edge nodes of the content delivery system 110, and in which a second-level mitigation (e.g., a stateful mitigation) is implemented by an attack mitigator 118 nearby to a content server 114 targeted by the attack. While shown in two figures for clarity, numbering is maintained between the interactions of FIGS. 3A and 3B.

The interactions begin at (1') and (1"), where a number of accessing computing devices 102 transmit data (e.g., over the network 106, not shown in FIGS. 3A and 3B) to edge nodes of the content delivery system, shown in FIG. 3A as network devices 112 within Layer Two of the content delivery system 110, for delivery to the content server 114. Because it will be assumed, for the purposes of description of FIGS. 3A and 3B, that the content delivery system 110 is experiencing a network attack, the data transmitted from the accessing computing devices 102 includes at least some malicious content, and may also include legitimate content, such as legitimate requests for web pages.

At (2') and (2"), the network devices 112 within Layer Two of the content delivery system 110 determine whether the transmitted data is directed to a destination that should be protected from network attack via hierarchical mitigation. In some instances, protected destinations may include identified or potentially identified targets of a network attack (e.g., destination network addresses, such as Internet Protocol ["IP"] addresses, associated with a large proportion of packets observed as associated with a network attack). In other instances, protected destinations may include a set of content servers 114 designated by an administrator of the content delivery system 110 (e.g., those servers 114 that have contracted with the system 110 to have mitigations applied during occurrence of network attacks). For the purposes of FIGS. 3A and 3B, it will be assumed that the content server 114 is associated with a protected destination network address.

Accordingly, at (3') and (3"), the layer two network devices 112 reroute at least a portion of the data intended for the content server 114 to attack mitigators 118 associated with Layer Two. Rerouting of traffic may occur, for example, by encapsulating the initially transmitted data according to a number of known techniques, such that the original data is maintained within a newly created data packet. For example, the network devices 112 may utilize virtual private networking ("VPN") protocols to cause the data intended for the content server 114 to be redirected to the attack mitigators 118. In one embodiment, all traffic destined for a protected network address is rerouted to the attack mitigators 118. In another embodiment, only a portion of traffic destined for a protected network address is rerouted to the attack mitigators 118. Illustratively, where an attack mitigator 118 applies a mitigation technique specific to a particular type of traffic (e.g., user datagram protocol ["UDP"] data packets), the network devices 112 may forward only traffic of that particular type to the attack mitigators 118. In some instances, a network device 112 may communicate with multiple attack mitigators 118 to provide different portions of traffic (e.g., according to the mitigation techniques applied) to the attack mitigators 118. The attack mitigators 118 associated with a network device 112 may be static (e.g., manually maintained by an administrator of the content delivery system 110) or dynamic (e.g., automatically established by the network device 112 and the attack mitigators 118 by exchange of information including, for example, capabilities of the network devices 112 and attack mitigators 118 and network distances between the network devices 112 and attack mitigators 118).

At (4') and (4"), the attack mitigators 118 process the data according to a first mitigation technique. The specific mitigation technique may be selected, for example, according to the computing resources available to the attack mitigator 118 (which may be limited, for example, by the location of the attack mitigator 118 within the content delivery system 110). Illustratively, the first mitigation technique may include a relatively simple mitigation technique, which does not require large amounts (or potentially any) information regarding observed traffic to be maintained at the attack mitigator 118, or which doesn't require complex calculations to be performed with respect to received packets. Further, in some embodiments, the specific mitigation technique used as the first mitigation technique may be selected according to a proportion of traffic of the content server 114 expected to be observed at the individual attack mitigator 118. Illustratively, because the data transmitted to the content server 114 can be expected to be split between at least the attack mitigators 118 of Layer Two, implementation of stateful mitigation techniques on the attack mitigators 118 may be expected to be inefficient or ineffective. Thus, the attack mitigators 118 may implement stateless mitigation techniques. Implementation of the first mitigation technique can cause at least a portion of the data transmitted by the accessing computing devices 102 to be discarded ("dropped") or throttled at the attack mitigators 118, thus limiting the negative effects of malicious data on the content delivery system 110.

The interactions described above are continued as depicted in FIG. 3B. Specifically, at (5') and (5"), the attack mitigators 118 of Layer Two forward the traffic (as originally received from the accessing computing devices 102 and filtered or shaped via the first mitigation technique) to a network device 112 of Layer One (e.g., via the network 116, not shown in FIG. 3B). At (6), the network device 112 within Layer One of the content delivery system 110 determines whether the transmitted data is directed to a destination that should be protected from network attack via hierarchical mitigation. As described above, protected destinations may include identified or potentially identified targets of a network attack, and/or content servers 114 designated by an administrator of the content delivery system 110 (e.g., those servers 114 that have contracted with the system 110 to have mitigations applied during occurrence of network attacks). Because the content server 114 is presumed for the purposes of description of FIGS. 3A and 3B to be associated with a protected destination network address, at (7), the network device 112 reroutes the data to the attack mitigator 118 (e.g., by using VPN encapsulation techniques). As described above, the network device 112 may forward all traffic destined for a protected network address to the attack mitigator 118, or may forward only a portion of traffic destined for a protected network address (only traffic of a particular type relevant to a mitigation technique applied by the attack mitigator 118).

At (8), the attack mitigator applies a second mitigation technique to the received traffic. The second mitigation technique may be relatively complex, as compared to the first level mitigation technique. For example, the second mitigation technique may include extensive processing of the received data packets, made possible by both the reduced number of data packets (e.g., due to filtering or shaping by the first mitigation technique) as well as a higher availability of computing resources at the attack mitigator 118 of Layer One (e.g., due to location in a data center, rather than at a network edge). In addition, the second mitigation technique may be based at least in part on an expectation that the attack mitigator 118 is capable of observing a large proportion (or all) traffic addressed to the content server 114 (e.g., because any or most communications paths to the content server 114 pass through the attack mitigator 118 of Layer One, or a network device 112 associated with that mitigator 118). Accordingly, the second mitigation technique may include stateful mitigation techniques that would be ineffective if implemented within Layer Two of the content delivery system 110.

Thereafter, at (9), the attack mitigator 118 transmits data, as filtered or shaped by the second mitigation technique, to the content server 114. Because the first and second mitigation techniques are intended to allow legitimate traffic to the content server 114 while reducing, eliminating, delaying or otherwise hindering malicious traffic, the data transmitted to the content server 114 may be significantly lower than the traffic that would be transmitted in the absence of any mitigation techniques being applied. Accordingly, the interactions of FIGS. 3A and 3B can significantly improve the ability of the content server 114 to respond to legitimate traffic and continue to serve content under conditions of a network attack.

While the interactions of FIG. 3 are described above sequentially, it is contemplated that each of the interactions may repeatedly occur, and that these interactions may occur at least in part concurrently. For example, the network devices 112 may continuously reroute traffic to attack mitigators 118 while a network attack is ongoing, and the attack mitigators 118, in turn, may apply increasing complex or different attack mitigation techniques to the traffic, according to the logical position of the attack mitigators 118.

One of skill in the art will appreciate that embodiments of the present disclosure may utilize additional or different interactions than those described with respect to FIGS. 3A and 3B. For example, while the attack mitigators 118 of Layer Two are described in FIGS. 3A and 3B as forwarding post-mitigation traffic to a network device 112 of Layer One, in some embodiments, the attack mitigators 118 of Layer Two may be configured to forward traffic directly to another attack mitigator 118 (e.g., of Layer One). Such communication may reduce or eliminate the need for a network device 112 of Layer One to reroute traffic that has already been processed by a first attack mitigator 118. As a further example, the attack mitigators of Layer Two may in some instance return post-mitigation traffic to the same network device 112 from which the traffic was received, or to other network devices 112, as established by routing protocols with the content delivery system 110. Additional alterations or expansions to the interactions of FIGS. 3A and 3B will be apparent to one skilled in the art in view of the present disclosure.

Figure 4:
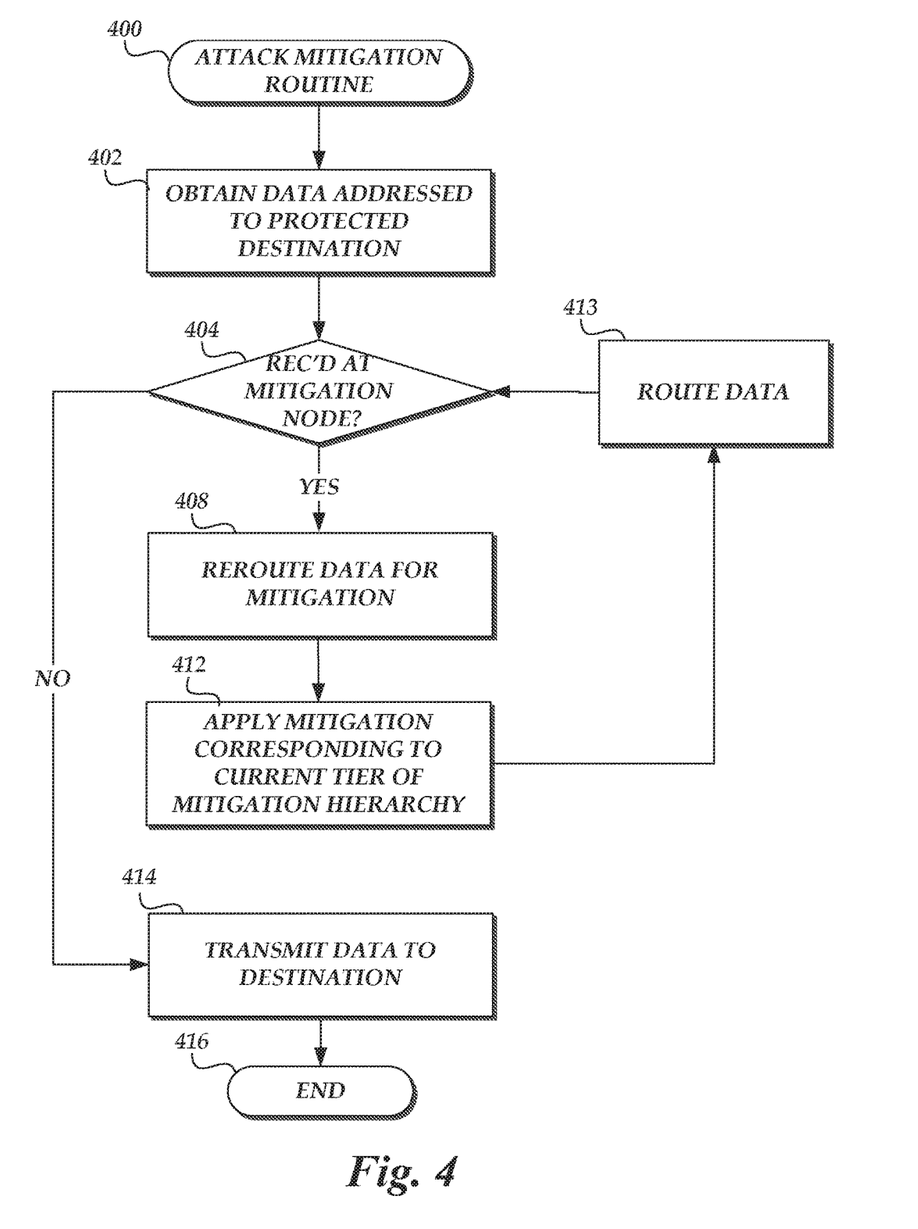
FIG. 4 is a flow chart depicting an illustrative routine for applying a hierarchical mitigation to network attacks detected at a content delivery system.

With reference to FIG. 4, one illustrative routine 400 for implementing hierarchical mitigation of network attacks within a content distribution system is described. The routine 400 may be carried out, for example, by the network devices 112 and attack mitigators 118 of FIG. 1. For the purposes of description of FIG. 4, it will be assumed that the routine 400 is implemented after detection of a network attack on the content delivery system 110 (e.g., as detected according to the systems and methods described within the '183 Application).

The routine 400 begins at block 402, where data addressed to a protected destination address (e.g., a destination address associated with a target that should be protected from network attack via hierarchy of attack mitigators 118) is obtained at the content delivery system 110. The routine 400 then continues to block 404, where implementation of the routine 400 varies according to whether the traffic has arrived at a mitigation node of the content delivery system 110. A mitigation node can generally correspond to a network device 112 associated with an attack mitigator 118. For example, where the data is obtained from a network external to the content delivery system, and where all edge nodes of the content delivery system are associated with attack mitigators 118, block 404 resolves positively, and the routine 400 continues at block 408, where the data is rerouted to an attack mitigator 118. Illustratively, the rerouted data may include all data addressed to a protected destination, or only a portion of data associated with a mitigation technique to be applied by an attack mitigator (e.g., only data associated with a specific protocol applicable to the mitigation technique). While not shown in FIG. 4, data that is not rerouted may be processed according to block 413, described in more detail below.

The routine 400 continues at block 412, where rerouted data is processed by an attack mitigator 118 associated with the mitigation node, according to the mitigation technique applied by that mitigator 118 (e.g., simple or stateless mitigation techniques for edge nodes, complex or stateful mitigation techniques for nodes nearby to a protected destination device). As noted above, examples of applied mitigation techniques can include, but are not limited to, stateless mitigations, such as some forms of packet filtering (e.g., based on a signature of attack packets, matching packets to regular expressions, etc.), aggressive aging, suspicion scoring, white listing, and black listing, as well as stateful mitigations, such as some forms of SYN proxying, connection limiting, and rate throttling.

Thereafter, the routine 400 continues at block 413, where the data is routed through the content delivery system 110 (e.g., via a network 116 of the content delivery system 110). The routine 400 the returns to block 404, where the routine 400 varies according to whether the data has been received at an additional mitigation node. For each mitigation node within a communications path between the source accessing computing device 102 and a protected destination device, blocks 408 through 413 may be repeated to filter or shape the data according to progressively more complex or computationally intensive mitigation techniques. Because each implementation of blocks 408 through 413 is expected to process progressively smaller amounts of data, implementation of iteratively more complex mitigation techniques may become possible at each instance of those blocks, such that more aggressive or complex mitigation techniques can be implemented than would otherwise be possible under single-tiered mitigation system.

In the instance that no more mitigation nodes exist between a current location of the data and the destination, the routine 400 continues to block 414, where the data (e.g. as shaped or filtered according to the hierarchy of mitigations applied by the various mitigation nodes) is transmitted to the destination device. Because such data has been filtered or shaped according to the hierarchy of mitigation techniques, the amount of malicious content within the data is expected to be reduced or eliminated. Accordingly, the routine 400 can significantly improve the ability of destination addresses to respond to legitimate traffic and continue to server content under conditions of a network attack.

One skilled in the art will appreciate that the routine 400 may include fewer or more interactions than described above. Illustratively, where attack mitigators 118 are configured to directly transmit data between one another, the interactions 404 and 408 may be modified, such that rerouting of data is only required prior to delivery of the data to a first attack mitigator 118. Further, while FIG. 4 is described above under the assumption that a network attack has previously been detected, some embodiments of the routine 400 may include interactions to detect such network attacks, such as those described within the '183 Application. Accordingly, the interactions of routine 400 are intended to be illustrative in nature, rather than exhaustive.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for mitigating malicious traffic on a communication network, the system comprising:
    a tiered hierarchy of mitigation devices, individual mitigation devices corresponding to a computing device comprises a hardware processor, the tiered hierarchy comprising:
        a first level, of the tiered hierarchy, that includes a plurality of mitigation devices at least a first threshold network distance away from a destination device targeted by a network attack, the plurality of mitigation devices of the first level configured to implement a first mitigation technique that is selected to be stateless based at least in part on a proportion of total traffic to the destination device expected to be observable at individual mitigation devices of the first level; and
        a second level, of the tiered hierarchy, that includes one or more mitigation devices at least a second threshold network distance away from the destination device, the second threshold network distance being less than the first threshold network distance, and the one or more mitigation devices of the second level configured to implement a second mitigation technique that is selected to be stateful based at least in part on a second proportion of the total traffic to the destination device expected to be observable at individual mitigation devices of the second level; and
    a router associated with the communication network and configured, on detection of a network attack on the communication network, to forward traffic addressed to a potential target of the attack to at least one mitigation device of the first level of the tiered hierarchy of mitigation devices.

2. The system of claim 1, wherein the network attack is a denial of service (DoS) attack.

3. The system of claim 1, wherein individual mitigation devices of the first level are associated with a lower expected proportion of total traffic to the potential target than individual mitigation devices of the second level.

4. The system of claim 1, wherein the one or more mitigation devices of the second level act as a proxy for traffic addressed to the potential target.

5. The system of claim 1, wherein the router is an edge node of the communications network, and wherein at least one mitigation device of the first level is located in the same geographic location as the router.

6. A computer-implemented method for mitigating malicious traffic on a communication network, the computer-implemented method comprising:
    receiving, at a communication node of the communication network, traffic addressed to a destination device;
    at the communication node, routing the traffic to a first mitigation device of a first level of a tiered hierarchy of mitigation devices;
    at the first mitigation device of the first level, the first mitigation device comprising a hardware processor:
        processing the traffic according to a first mitigation technique, wherein the first mitigation technique is as selected to be stateless based at least in part on a proportion of total traffic to the destination device expected to be observable at individual mitigation devices of the first level; and
        routing the traffic to a second mitigation device of a second level of the tiered hierarchy of mitigation devices;
    at the second mitigation device of the second level, the second mitigation device comprising a hardware processor:
        processing the traffic according to a second mitigation technique, wherein the second mitigation technique is selected to be stateful based at least in part on a second proportion of the total traffic to the destination device expected to be observable at individual mitigation devices of the second level; and
        routing the traffic to the destination device.

7. The computer-implemented method of claim 6, wherein the communication node is an edge router of the communication network, and wherein the first mitigation device is collocated with the edge router.

8. The computer-implemented method of claim 6, wherein the communication node and the first mitigation device are implemented in a common physical computing device.

9. The computer-implemented method of claim 6, wherein routing the traffic to the destination device comprises routing the traffic to a third mitigation device of a third level of the tiered hierarchy of mitigation devices, and wherein the computer-implemented method further comprises, at the third mitigation device of the third level, processing the traffic according to a third mitigation technique, wherein the third mitigation technique is selected based at least in part on a third proportion of the total traffic to the destination device expected to be observable at individual mitigation devices of the third level.

10. The computer-implemented method of claim 6, wherein the first and second mitigation are each selected as at least one of packet filtering, signature matching, regular expression matching, SYN proxying, connection limiting, rate throttling, aggressive aging, white listing, suspicion scoring, or black listing.

11. The computer-implemented method of claim 6, wherein routing the traffic to the second mitigation device of the second level of the tiered hierarchy of mitigation devices comprises routing the traffic to a second router within the communication network that is associated with the second mitigation device.

12. The computer-implemented method of claim 6, wherein rerouting the traffic to the first mitigation device of the first level of the tiered hierarchy of mitigation devices comprises encapsulating the traffic according to a virtual private networking (VPN) protocol.

13. The computer-implemented method of claim 6, wherein processing the traffic according to a first mitigation technique comprises discarding at least a portion of the traffic, and wherein routing the traffic to the second mitigation device comprises routing a remaining portion of the traffic that was not discarded according to the first mitigation technique.

14. A system for mitigating malicious traffic on a communication network, the system comprising:
   a router associated with the communication network and configured to route traffic associated with a potential target of a network attack to a first tier of a hierarchical mitigation system comprising at least two tiers of attack mitigation devices;
   a first mitigation device comprising a hardware processor and associated with the first tier of the hierarchical mitigation system, the first mitigation device configured with computer-executable instructions to:
      obtain the traffic associated with the potential target from the router;
      process the traffic according to a first mitigation technique, wherein the first mitigation technique is selected to be stateless based at least in part on a proportion of total traffic to the potential target expected to be observable at individual mitigation devices of the first tier; and
      transmit the traffic to second tier of the hierarchical mitigation system; and
   a second mitigation device comprising a hardware processor and associated with a second tier of the hierarchical mitigation system, the second mitigation device configured with computer-executable instructions to:
      obtain the traffic associated with the potential target from the first mitigation device;
      process the traffic according to a second mitigation technique, wherein the second mitigation technique selected to be stateful based at least in part on a second proportion of the total traffic to the potential target expected to be observable at individual mitigation devices of the second tier; and
      route the traffic to the potential target.

15. The system of claim 14, wherein the second mitigation device is collocated with the potential target.

16. The system of claim 14, wherein the second mitigation device and the destination device are implemented in a common physical computing device.

17. The system of claim 14, wherein the computer-executable instructions cause the second mitigation device to process the traffic according to the second mitigation technique at least partly by discarding a portion of the traffic, and wherein the traffic routed to the potential target excludes the discarded portion.

18. The system of claim 14, wherein the router is further configured, prior to routing the traffic to the first tier, to determine that the first mitigation technique is applicable to the traffic.

19. The system of claim 18, wherein determining that the first mitigation technique is applicable to the traffic includes determining that the first mitigation technique is applicable to at least one of a protocol of the traffic or data carried within the traffic.

* * * * *

UNITED STATES PATENT AND TRADEMARK OFFICE
CERTIFICATE OF CORRECTION

PATENT NO. : 10,516,694 B1
APPLICATION NO. : 15/084354
DATED : December 24, 2019
INVENTOR(S) : Piyush Gupta Page 1 of 1

It is certified that error appears in the above-identified patent and that said Letters Patent is hereby corrected as shown below:

In the Claims

In Column 16, Lines 46-47, Claim 6, delete "is as" and insert --is--.

Signed and Sealed this
Thirty-first Day of March, 2020

Andrei Iancu
*Director of the United States Patent and Trademark Office*